UNITED STATES PATENT OFFICE.

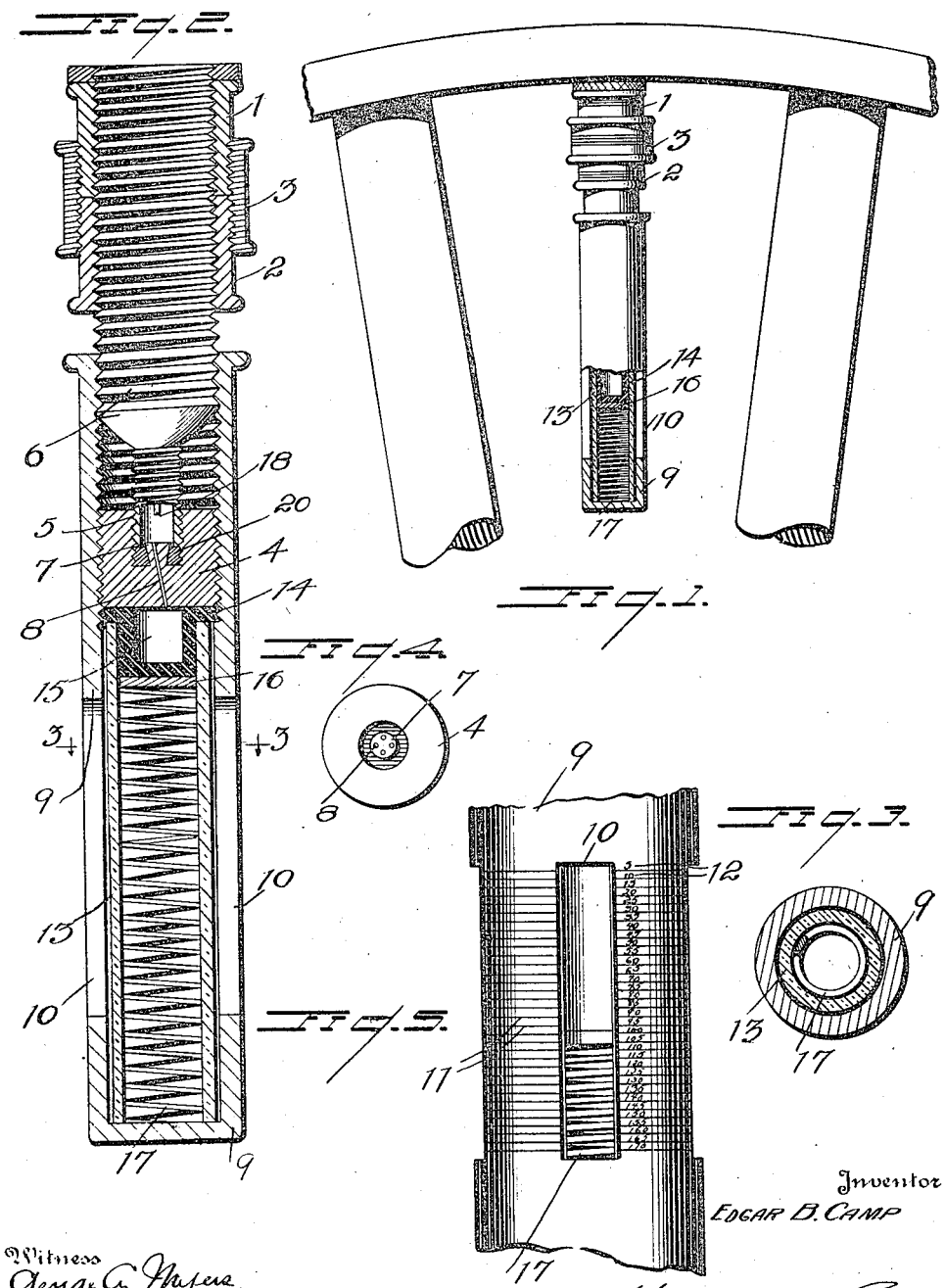

EDGAR BOYD CAMP, OF ANAHEIM, CALIFORNIA.

AIR-GAGE INDICATOR.

1,285,557.   Specification of Letters Patent.   Patented Nov. 19, 1918.

Application filed November 20, 1917. Serial No. 202,966.

*To all whom it may concern:*

Be it known that I, EDGAR BOYD CAMP, a citizen of the United States, and a resident of Anaheim, in the county of Orange and State of California, have invented an Improvement in Air-Gage Indicators, of which the following is a specification.

My invention is an improvement in air gage indicators, and consists in certain novel constructions and combinations of parts hereinafter described and claimed.

In the drawings,

Figure 1 is a side view of the improved indicator with parts in section.

Fig. 2 is an enlarged longitudinal section.

Fig. 3 is a section on the line 3—3 of Fig. 2, looking in the direction of the arrows adjacent to the line.

Fig. 4 is an end view of the plug.

Fig. 5 is a partial side view of the indicator cover.

In the present embodiment of the invention a cover is provided for the valve stem of the tire, the said cover consisting of an indicator cover 9 and sections 1 and 2 which are internally and partly externally threaded, and are connected by a union 3. The sections 1 and 2 are adapted to be threaded upon the tire valve nipple 6, as is also the indicator cover 9, and a cap 4 is threaded into the open end of the indicator cover 9. This cap has the end adjacent to the tire valve nipple recessed, as indicated at 5, and internally threaded to engage the tire valve nipple 6, the outer end of the nipple being threaded into the recess 5. It will be noticed that at the recess the cap has an extension or plug 7, and openings 8 lead from the top of this extension or plug through the cap, the said openings in the present instance being four in number. An indicator cover 9 is engaged with the threaded cap 4, and tire valve nipple 6, and this indicator cover 9 has oppositely arranged longitudinally extending sight openings 10. At opposite sides of each opening series of graduations 11 are provided, the said graduations forming with indicating numerals 12 scales for indicating the air pressure. A glass tube 13 is arranged within the indicator cover, the said tube bearing at its outer end against the closed end of the indicator cover and at its inner end against an outwardly extending rib or flange 14 on an expansion thimble 15. The body of this thimble extends into the glass tube, and a washer or disk 16 is arranged at the closed end of the expansion thimble. A spiral spring 17 is arranged within the tube between the closed end of the indicator cover and the disk 16, and this spring is intended to be compressed by the air pressure in the inner tube of the tire, and the position of the washer or disk 16 indicates the air pressure within the tire.

The tire valve stem 18 is engaged by the inner end of the extension plug 7 to open the valve, to permit the air pressure to escape into the interior of the thimble 15. In use the entire device, as shown in Fig. 2, takes the place of the ordinary cap and cover of the valve. After the tire has been inflated the device shown in Fig. 2 is placed on the valve stem, and the cap 4 and indicator cover 9 is screwed down to open the valve. The air pressure passing through the openings 8 expands the thimble 15, and the disk 16 acts as an indicator, coöperating with the scale to indicate the air pressure in the tire.

It will be noticed that a gasket 20 is arranged between the ends of the valve 6 and the bottom of the recess 5.

I claim:—

1. A device of the character specified, comprising a valve cap having an internally threaded recess for engaging the valve nipple of an inner tube, and having an extension for engaging the stem of the valve to open the same, and having longitudinally extending openings for permitting the pressure within the valve to pass through the cap, an indicator cover having threaded engagement with the cap and valve nipple and having the other end closed and having oppositely arranged longitudinally extending sight openings, said indicator cover having scales at the openings, a tube of transparent material held within the indicator cover and bearing at its outer end against the closed end of the indicator cover, an expansion thimble at the inner end of the tube and having a flange received between the said end of the tube and the adjacent end of the valve cap, a spring between the expansion thimble and the indicator cover, and an indicator at the outer end of the expansion thimble for coöperating with the scale.

2. A device of the character specified, comprising a valve cap having an internally threaded recess for engaging the valve nipple of an inner tube, an extension for engaging the stem of the valve to open the same, and having longitudinally extending openings for permitting the pressure within the valve nipple to pass through the cap, an indicator cover having threaded engagement with the cap and valve nipple and having a longitudinally extending opening and a scale at the opening, a tube of transparent material held within the indicator cover between the same and the cap, an expansion thimble between the tube and the cap and adapted to be expanded longitudinally of the tube by the air pressure, and an indicator at the outer end of the expansion thimble for coöperating with the scale.

3. A device of the character specified, comprising a cap for engaging the valve nipple of an inner tube having an opening therethrough, and means for releasing the valve when the cap is screwed home, an indicator cover having threaded engagement with the cap and valve nipple and provided with a sight opening, and a scale at the sight opening, an expansion thimble held within the indicator cover and adapted to be expanded by the air pressure passing through the cap, an indicator in connection with the expansion thimble coöperating with the scale, a spring normally moving the indicator and expansion thimble toward the nipple and a transparent tube encircling said expansion thimble and spring.

4. A device of the character specified, comprising an indicator cover having sight openings and a scale and internally threaded to engage at one end the valve nipple of an inner tube, the other end of the cover being closed, an expansion thimble held within the cover and adapted to be expanded by the air pressure passing from the valve, the cover having means for engaging the valve stem to open the same, and a spring normally pressing the expansion thimble toward the tire.

EDGAR BOYD CAMP.

Witnesses:
 IDA L. CAMP,
 RUTH E. BANDINI.

Copies of this patent may be obtained for five cents each, by addressing the "Commissioner of Patents, Washington, D. C."